US006695316B2

United States Patent
Popa et al.

(10) Patent No.: US 6,695,316 B2
(45) Date of Patent: Feb. 24, 2004

(54) APPARATUS AND METHODS FOR SUPPORTING A RETRACTABLE PACKING RING

(75) Inventors: Daniel Michael Popa, Schenectady, NY (US); Richard Jon Chevrette, Troy, NY (US); Christopher Edward Wolfe, Schenectady, NY (US); George Horner Kirby, III, Charlton, NY (US)

(73) Assignee: General Electric Company, Schenectady, NY (US)

( * ) Notice: Subject to any disclaimer, the term of this patent is extended or adjusted under 35 U.S.C. 154(b) by 13 days.

(21) Appl. No.: 09/957,631

(22) Filed: Sep. 21, 2001

(65) Prior Publication Data

US 2003/0057653 A1 Mar. 27, 2003

(51) Int. Cl.$^7$ ................................. F16J 15/44
(52) U.S. Cl. ........................ 277/411; 277/416
(58) Field of Search ................. 277/411, 416

(56) References Cited

U.S. PATENT DOCUMENTS

| | | | | |
|---|---|---|---|---|
| 2,239,637 A | * | 4/1941 | Zesewitz | 277/416 |
| 2,600,991 A | * | 6/1952 | Hatrgrove | 277/416 |
| 3,155,395 A | * | 11/1964 | Hoffman | 277/416 |
| 3,642,292 A | * | 2/1972 | Dougherty | 277/56 |
| 4,436,311 A | * | 3/1984 | Brandon | 277/27 |
| 5,374,068 A | * | 12/1994 | Jewett et al. | 277/1 |
| 5,395,124 A | * | 3/1995 | Brandon | 277/53 |
| 5,464,226 A | * | 11/1995 | Dalton | 277/53 |
| 5,709,388 A | | 1/1998 | Skinner et al. | |
| 5,810,365 A | * | 9/1998 | Brandon et al. | 277/416 |
| 6,022,027 A | * | 2/2000 | Chevrette et al. | 277/413 |
| 6,220,603 B1 | * | 4/2001 | Brandon et al. | 277/419 |

FOREIGN PATENT DOCUMENTS

GB 277806 * 9/1927

* cited by examiner

Primary Examiner—J. J. Swann
Assistant Examiner—Carlos Lugo
(74) Attorney, Agent, or Firm—Nixon & Vanderhye

(57) ABSTRACT

A rotary machine has stationary upper and lower housings with circumferential grooves and a rotatable component, as well as annular sealing segments movable toward and away from the rotating components between large and small clearance positions. To prevent circumferential displacement of the lower side segments by gravity forces and to enable the lowermost segment in the lower housing to move vertically between inner and outer clearance positions, the side segments of the lower housing are supported by brackets resting on a support surface forming part of the horizontal midline at the juncture of the upper and lower housings. Consequently, the gaps between the lower ends of the side segments and the opposite ends of the lower segment in the open position of the segments remains, enabling the lower segment to move radially vertically inwardly upon closing the seals.

13 Claims, 3 Drawing Sheets

APPARATUS AND METHODS FOR SUPPORTING A RETRACTABLE PACKING RING

BACKGROUND OF THE INVENTION

The present invention relates to seals between rotating and stationary components of a rotary machine such as a steam turbine and particularly relates to apparatus and methods for supporting variable clearance packing ring segments to prevent circumferential slippage of the segments about the grooves of the stationary component, while enabling the segments to move toward and away from the rotating component, i.e., between large and small clearance positions relative to the rotating component.

In prior U.S. Pat. No. 5,709,388, of common assignee herewith, there is disclosed a rotary machine such as a steam turbine having upper and lower housings secured to one another about a horizontal midline. Each housing includes an arcuate groove having a dovetail shape, i.e., has locating flanges directed axially toward one another and defining a slot therebetween for receiving a plurality of annular segments. Each of the annular segments includes an arcuate seal face for opposition to the sealing surface of the rotating component and which seal face typically carries radially directed axially spaced labyrinth seal teeth. Each seal ring segment also has a similar dovetail shape including a pair of flanges directed axially away from one another for disposition within the dovetail groove of the stationary component and a neck which joins the seal face and the flanges of the segment and passes through the slot defined by the locating flanges of the groove.

As disclosed in the aforementioned patent, three segments are disposed in the upper half and three in the lower half of the housing. The side segments in the lower housing are supported against downward circumferential displacement in the groove of the lower housing by angle brackets. It is necessary to support the side segments to prevent binding of the lowermost segment in the lower housing with the side segments to prevent radial inward (upward) displacement of the lowermost segment under steam pressure as necessary to effect the seal. One leg of each angle bracket is secured to the outer uppermost side of a side segment in the lower housing and the opposite leg is supported on a surface of a slot machined into the lower housing, the slot opening through the horizontal midline. The horizontal leg of each bracket supports the associated side segment for horizontal movement toward and away from the rotating component. It will be appreciated that the variable clearance packing ring segments are spring-biased into outward clearance positions relative to the rotor shaft and, in operation, are biased by fluid pressure into smaller inner clearance positions relative to the shaft to effect the operating seal.

Standard non-retractable packing rings require a machined slot within the upper housing at the diaphragm horizontal joint. To update rotary machines using non-retractable packing rings to machines having retractable packing rings, the lower housing, according to the aforementioned patent, requires the formation of a notch or slot adjacent the horizontal midline, together with the provision of steam feed holes to be drilled into both housing halves. This has significant impact on the installation cycle requiring substantial time to effect the changeover. As will be appreciated, any modification to the diaphragm halves, particularly the lower housing half, to accommodate the variable clearance packing ring segments, by forming a slot or notch, increases the power plant outage cycle time at substantial expense to the electrical utility employing the steam turbine. Accordingly, there is a need to reduce the cycle time when retrofitting a steam turbine with variable clearance packing ring segments.

BRIEF SUMMARY OF THE INVENTION

In accordance with a preferred embodiment of the present invention, there is provided apparatus and methods for supporting upper and lower packing ring segments in the upper and lower housings, respectively. Preferably, packing ring segments are retrofitted in machines using non-retractable packing rings without requiring modification of the lower housing in order to accommodate the segment support brackets, thereby reducing installation cycle time. Particularly, instead of supporting the outwardly projecting horizontal legs of the angle brackets supporting the side segments in the lower housing in notches or slots of the diaphragm, those segments are supported by portions of the surface of the lower housing at the horizontal midline. Accordingly, the formation of a slot or notch along opposite sides of the lower housing at the horizontal midline is unnecessary. The upper housing has an existing slot opening through the horizontal midline in which is received a stop for supporting the side segments in the upper housing. Each horizontal outwardly projecting leg of the support member for a side segment of the lower housing is also disposed in the same slot. It will be appreciated that the slot in the upper housing is preexisting and requires no further machining or other reworking to accommodate both the stop and the bracket portion. The brackets, and hence the side segments in the lower housing are thus slidable horizontally on a surface portion of the horizontal midline of the lower housing between the small and large clearance positions.

In a preferred embodiment according to the present invention, there is provided a rotary machine comprising a component rotatable about an axis, a stationary component including upper and lower housings of the machine joined together along a horizontal midline and an annular groove about the axis, the lower housing including a support surface along and coincident with the horizontal midline, the stationary component having a first axially directed locating flange about the axis and in part defining a slot opening into the groove, a plurality of generally arcuate seal ring segments about the axis, each segment having an arcuate sealing face, a second axially directed locating flange disposed in the groove and a neck portion in the slot and interconnecting the second flange and the sealing face, certain of the plurality of the segments being movable between radial outward and radial inward positions relative to the axis, a member engaging between the support surface along the horizontal midline of the stationary component and each of a pair of the plurality of segments on respective opposite sides of the lower housing of the stationary component for supporting the pair of segments for movement generally horizontally toward and away from a vertical plane through the axis between inner and outer positions, respectively, and fixing the pair of segments against vertical downward movement, the pair of segments comprising different ones of the plurality of segments than the certain segments, the pair of segments being disposed in the lower housing of the stationary component and straddling another segment of the plurality of the segments in the lower housing whereby each member maintains a gap between the lower end of one of the pair of segments and an opposing end of another segment when the certain segments lie in radially outward positions and the pair of segments lie in the outer positions.

In a further preferred embodiment according to the present invention, there is provided a rotary machine comprising a component rotatable about an axis, a stationary component including an annular groove about the axis, the stationary component comprising upper and lower housings joined to one another along a generally horizontal midline of the stationary component, the upper housing including a radially inwardly opening slot on opposite sides of the stationary component defined in part by an upper surface portion of the lower housing forming part of the horizontal midline, the stationary component having a first pair of axially directed locating flanges about the axis and extending axially toward one another, the flanges defining a slot opening into the groove, a plurality of generally annular segments about the axis, each segment having an arcuate sealing face, a second pair of locating flanges disposed in the groove and extending axially away from one another and a neck portion in the slot and interconnecting the second flanges and the seal faces, at least three of the plurality of segments being disposed in each of the upper and lower housings and forming a circumferentially extending seal ring about the rotatable component, the segments being movable between outward large and inward small clearance positions relative to the rotatable component and members engaging between the lower housing along the upper surface portions thereof and a pair of the segments on respective opposite sides of the lower housing for supporting the pair of segments against displacement in the groove in a circumferentially downward direction and for movement generally horizontally toward and away from a vertical plane through the axis and between inward and outward positions, respectively.

In a further preferred embodiment according to the present invention, there is provided in a rotary machine having a component rotatable about an axis, a stationary component including upper and lower housings joined together at a horizontal midline and an annular groove about the axis, a plurality of generally annular segments about the axis with at least a portion of each segment disposed in the groove and having a seal face projecting from the groove, a method of installing the segments into the rotary machine, comprising the steps of securing a support member to each of a pair of the plurality of segments on respective opposite sides of the lower housing of the stationary component and locating a horizontally projecting outward portion of the member along a surface of the lower housing forming part of the horizontal midline between the upper and lower housings for supporting the pair of segments for movement generally horizontally toward and away from a vertical plane through the axis between inner and outer positions, respectively, and fixing the pair of segments against vertical downward movement.

DETAILED DESCRIPTION OF THE INVENTION

Figure 1:
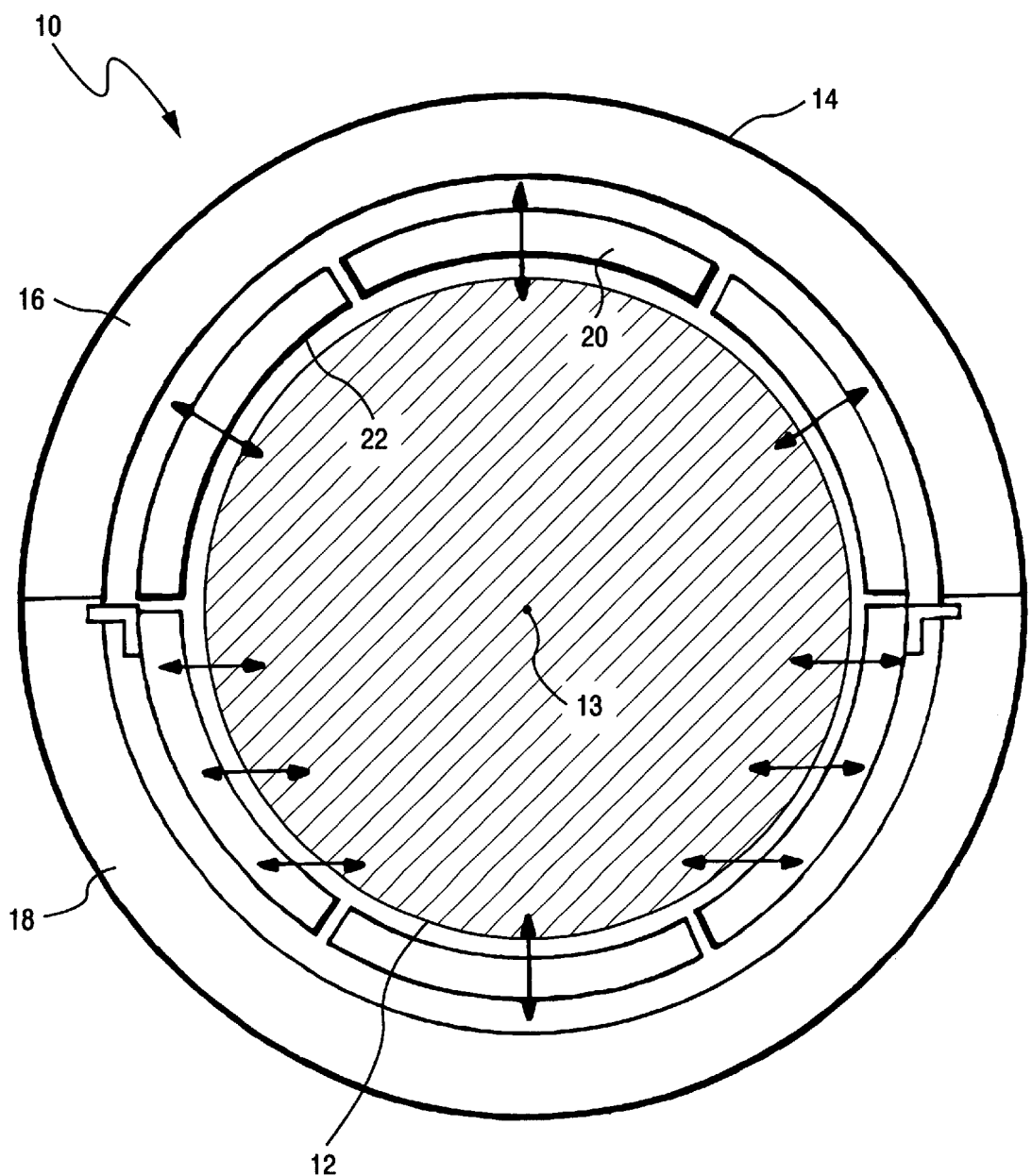
FIG. 1 is a schematic illustration of the direction of movement of packing ring segments relative to upper and lower housings of a rotary machine according to the prior art.

Referring now to FIG. 1, there is schematically illustrated a portion of a rotary machine, for example, a steam turbine, generally designated 10, having a rotary component 12, i.e., a turbine shaft rotatable about an axis 13, and a stationary component for a housing 14 comprised of upper and lower halves 16 and 18, respectively. As conventional, the rotary machine is provided with a multi-stage labyrinth seal. Each stage of the labyrinth seal includes a plurality of seal segments or housings 20 disposed about the turbine shaft 12 separating high and low pressure regions on opposite axial sides of the seal segments. Each segment is arcuate as viewed axially, e.g., as in FIG. 2, and has an arcuate sealing face 22 typically having a plurality of labyrinth seal teeth 24 spaced axially one from the other and projecting toward the rotor.

Figure 5:
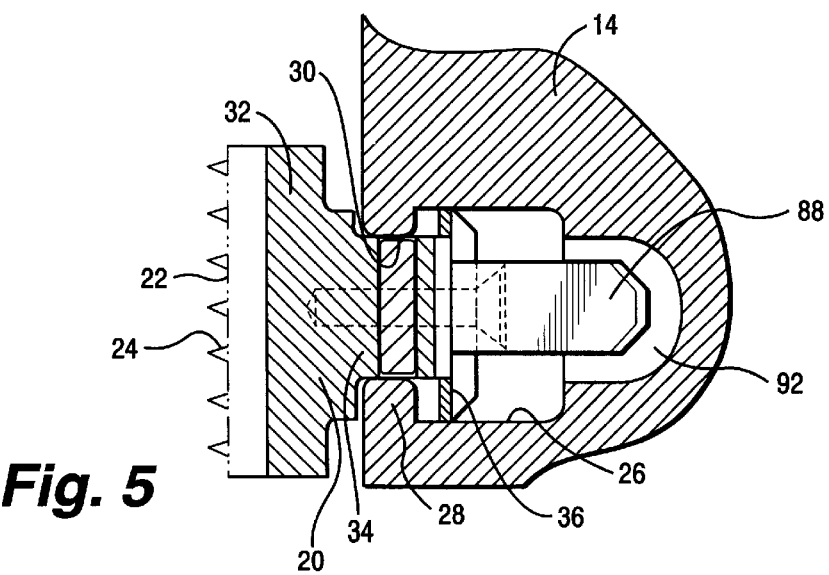
FIG. 5 is a cross-sectional view thereof taken generally about on line 5—5 in FIG. 3.

The seal segments 20 as best illustrated in FIG. 5 are disposed in a groove 26 in the stationary component 14. The groove 26 has a generally dovetail configuration having first locating flanges 28 extending axially toward one another defining a slot 30. The seal segments 20 have flanges 32 directed axially away from one another for mounting the seal teeth and extending radially inwardly from a neck 34 of reduced dimension disposed between the first locating flanges 28 of the stationary component 14. The sealing segments 20 also have second locating flanges 36 received within the grooves 26 of the stationary component. It will be appreciated that in variable clearance packing rings, springs, not shown, cooperate between the first and second locating flanges 28 and 36, respectively, within the groove to bias each sealing segment 20 toward a radially outward position, i.e., a large clearance position relative to the surface of the rotor. This condition occurs at startup. When the seal segments are part of a variable packing ring seal system, steam is provided in a plurality of passages in the stationary component along the outer face of the seal segments whereby the segments are displaced inwardly toward the rotary component against the bias of the springs. This type of positive pressure variable clearance packing ring segment is conventional in the art, for example, as described and illustrated in U.S. Pat. No. 5,374,068, of common assignee herewith, the disclosure of which is incorporated herein by reference.

Figure 2:
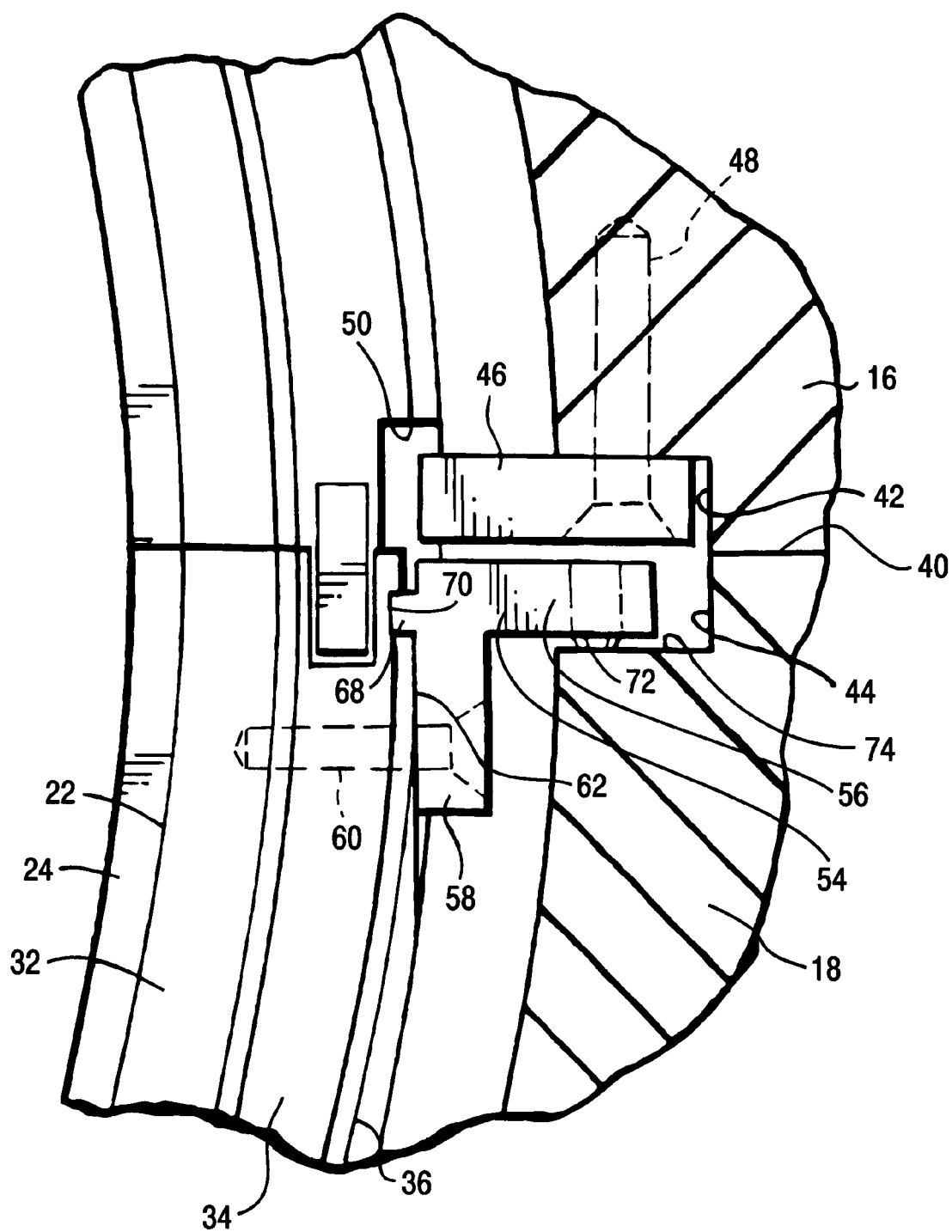
FIG. 2 is an enlarged fragmentary cross-sectional view taken axially along a midline and one side of the rotary machine illustrating adjoining upper and lower ends of the side segments in the upper and lower housings of the stationary component of the rotary machine, respectively, in accordance with the prior art.

Referring to FIG. 2 and in accordance with U.S. Pat. No. 5,709,388, the disclosure of which is also incorporated by reference, the upper and lower housings 16 and 18, respectively, are joined one to the other along a midline 40 by bolts, not shown. At the joint, slots or recesses 42 and 44 are formed in the upper and lower housings 16 and 18, respectively. A stop 46 is secured, for example, by bolts 48, to the upper housing 16 in slot 42 and projects radially inwardly to extend into a slot or recess 50 formed along an end of a side seal segment 20. The stop 46 engages the end stop of the side seal segments in the upper housing to prevent the segments from falling from the upper housing when removed from the lower housing.

Also illustrated in FIG. 2 is a angle bracket 54 having horizontal and vertically extending legs 56 and 58, respectively. The vertically extending leg 58 is secured by a bolt 60 to the outer edge of a side seal segment along a flat 62 thereof. A projection 68 engages in a recess 70 also formed along the flat in the side seal segment received along the upper side of the lower housing to stabilize the bracket. The horizontal leg 56 includes an adjustable set screw 72 for engaging the lower horizontal surface 74 of the recess 44. It will also be appreciated that the brackets on each of the opposite sides of the lower housing support the side seal segments and prevent them from dropping vertically downwardly along the dovetail groove. The brackets also enable horizontal movement of the side seal segments toward and away from a vertical plane through the axis of the rotor between large and small clearance positions relative to the rotor surface.

As noted previously, the standard, non-retractable packing rings require only one machined slot within the upper housing. When replacing non-retractable packing rings with variable clearance type packing rings, the arrangement disclosed in FIG. 2 and in U.S. Pat. No. 5,709,388 has previously been used and found satisfactory. However, the recess 44 is required to be machined into the lower housing during this retrofit. Thus, modifications of the housing which increase utility outage time and cost are required to enable this retrofit.

Figure 3:
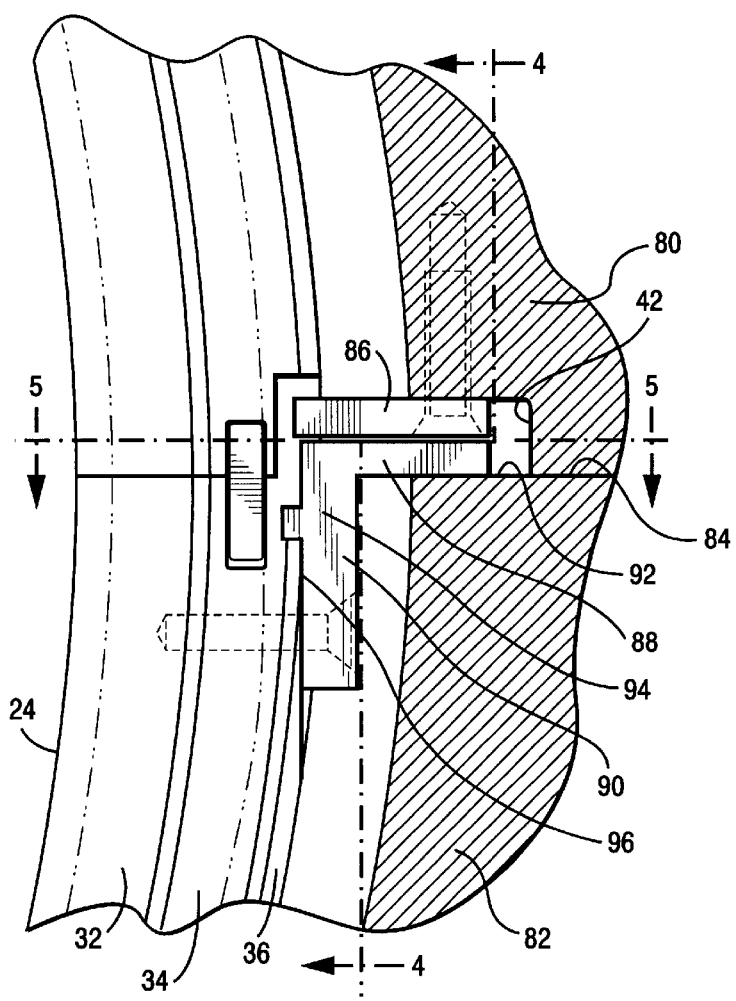
FIG. 3 is a view similar to FIG. 2 illustrating the disposition of a support member for a retractable packing ring according to a preferred embodiment of the present invention.
Figure 4:
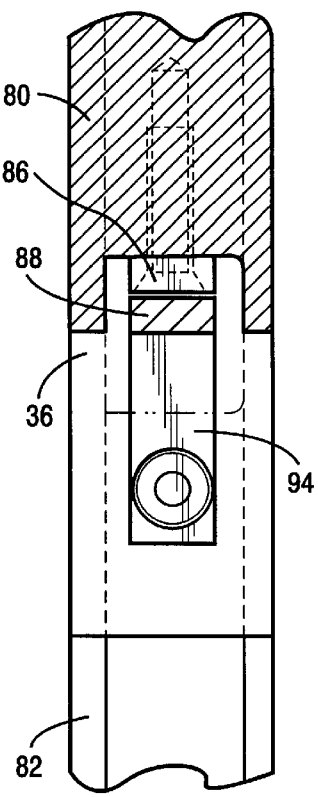
FIG. 4 is a cross-sectional view thereof taken generally about on line 4—4 in FIG. 3.

To eliminate the outage time and costs associated with the formation of the slots 44 in the lower housing, either as original equipment manufacture or as a retrofit, the present invention provides for support of the lower side packing ring segments without modification to the lower housing. Particularly, and referring to FIG. 3, it will be seen that the upper housing 80 corresponds identically to the upper housing 16 illustrated in FIG. 2. The lower housing 82 likewise corresponds identically to the lower housing 18 of FIG. 2 except the lower housing 82 does not have machined slots 44 along opposite sides of the housing at the horizontal midline 84 between the upper and lower housings. Instead, the recess or slot 42 formed in the upper housing accommodates both a stop 86 and a support portion or horizontal leg 88 of an angle bracket or member 90. The stop 86 is similar to the stop 46 except that it has approximately one-half the depth. The horizontal leg 88 is similar to the horizontal leg 56 except that its depth is approximately one-half of the depth of the leg 56. Significantly, however, the horizontal leg 88 of the angle bracket 90 is supported by a surface of the horizontal midline or joint 84. The vertical leg 94 of the bracket 90 is secured to the flat 96 of the side segment similarly as illustrated in FIG. 2. The support surface 92 along the horizontal midline in part defines the slot 42. With the stop 86 and the horizontal leg 88 having dimensions for reception within the recess 42 and the bracket 90 being otherwise the same as the bracket 58, it will be seen that the step of machining a slot or recess into the lower housing has been completely eliminated while retaining all of the functions of both the stop and angle bracket as previously described in U.S. Pat. No. 5,709,388.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotary machine comprising:
    a component rotatable about an axis;
    a stationary component including upper and lower housings of the machine joined together along a horizontal midline and an annular groove about said axis, said lower housing including horizontally extending support surfaces along and coincident with said horizontal midline at opposite sides, respectively, of said lower housing;
    said stationary component having a first axially directed locating flange about said axis and in part defining a slot opening into said groove;
    a plurality of generally arcuate seal segments about said axis, each segment having an arcuate sealing face, a second axially directed locating flange disposed in said annular groove and a neck portion in said slot and interconnecting said second flange and said sealing face;
    certain of said plurality of said segments being movable between radial outward and radial inward positions relative to said axis;
    first and second members engaging between said support surfaces, respectively, along said horizontal midline of said stationary component and first and second segments located wholly within and on respective opposite sides of said lower housing of said stationary component for supporting said first and second segments for movement generally horizontally toward and away from a vertical plane through said axis between inner and outer positions, respectively, and fixing said first and second segments against vertical downward movement, said first and second segments comprising different ones of said plurality of segments than said certain segments;
    said first and second segments being disposed in said lower housing of said stationary component and straddling one or more segments of said plurality of said segments in said lower housing whereby said first and second members maintain a gap between respective lower ends of said first and second segments and ends of said one or more segments adjacent to said lower ends when said certain segments lie in said radially outward positions and said first and second of segments lie in said outer positions.

2. A machine according to claim 1 wherein each said member includes a support portion slidable in a generally horizontal direction along said support surface along said horizontal midline.

3. A machine according to claim 1 wherein said upper housing includes a slot above the horizontal midline at each of opposite sides thereof, said member on each opposite side of said upper housing including a support portion disposed in said slot.

4. A machine according to claim 1 wherein said upper housing includes a slot set back from and opening into the horizontal midline at each opposite side thereof, a stop carried by said upper housing in each said slot and projecting generally horizontally toward said rotatable component, said stops being engaged by side seal segments along opposite sides of the upper housing thereby retaining said side seal segments in said upper housing.

5. A machine according to claim 4 wherein each of said members includes a support portion disposed in said slot with said stop.

6. A machine according to claim 1 wherein each segment of said first and second segments thereof has a flat along an outer face thereof, each said member including an angle bracket having one leg thereof secured to said flat and another leg projecting outwardly of the segment to which the angle bracket is secured for slidable engagement along said support surface.

7. A rotary machine comprising:

a component rotatable about an axis;

a stationary component including an annular groove about said axis, said stationary component comprising upper and lower housings joined to one another along a generally horizontal midline of said stationary component, said upper housing including a radially inwardly opening slot on opposite sides of said stationary component defined in part by a horizontally extending upper surface portion of said lower housing coincident with and forming part of the horizontal midline;

said stationary component having a first pair of axially directed locating flanges about said axis and extending axially toward one another, said flanges defining a slot opening into said groove;

a plurality of generally arcuate seal segments about said axis, each segment having an arcuate sealing face, a second pair of locating flanges disposed in said groove and extending axially away from one another and a neck portion in said slot and interconnecting said second flanges and said seal faces;

at least three of said plurality of segments being disposed in each of said upper and lower housings and forming a circumferentially extending seal ring about said rotatable component, said segments being movable between outward large and inward small clearance positions relative to said rotatable component; and members engaging between said lower housing along said upper surface portions thereof and a pair of said segments located wholly within and on respective opposite sides of said lower housing for supporting said pair of segments against displacement in said groove in a circumferentially downward direction and for movement generally horizontally toward and away from a vertical plane through said axis and between inward and outward positions, respectively.

8. A machine according to claim 7 wherein each said member comprises a bracket secured to an outer face of one of said pair of said segments and having a support leg projecting outwardly of said one of said pair of segments, said upper surface portions of said lower housing forming stops for supporting said support legs, said support legs being slidable in generally horizontal directions relative to said rotatable component.

9. A machine according to claim 7 wherein each of said pair of segments has a flat along an outer surface thereof, each said member including an angle bracket having one leg thereof secured to said flat and another leg projecting outwardly of said segment to which the angle bracket is secured, said upper housing having a recess for receiving said another leg, each said another leg being slidable generally horizontally relative to said recess toward and away from said vertical plane and along said upper surface portion of said lower housing.

10. In a rotary machine having a component rotatable about an axis, a stationary component including upper and lower housings joined together at a horizontal midline and an annular groove about the axis, a plurality of generally annular segments about the axis with at least a portion of each segment disposed in said groove and having a sealing face projecting from said groove, a method of installing the segments into the rotary machine, comprising the steps of:

securing a support member to each of a pair of said plurality of segments located wholly within and on respective opposite sides of said lower housing of said stationary component; and locating a horizontally projecting outward portion of said member along a horizontally extending surface of the lower housing forming part of the horizontal midline between the upper and lower housings for supporting the pair of segments for movement generally horizontally toward and away from a vertical plane through the axis between inner and outer positions, respectively, and fixing the pair of segments against vertical downward movement.

11. A method according to claim 10 including disposing the horizontal portion of said member in a slot formed in the upper housing adjacent the midline between said upper and lower housings.

12. A method according to claim 10 including disposing the horizontal portion of said member in a slot formed in the upper housing adjacent the midline between said upper and lower housings, said slot having a stop disposed therein for engagement by segments along opposite sides of the upper housing thereby retaining the upper housing side segments in the upper housing.

13. A method according to claim 10 including retrofitting the segments into the upper and lower housing without alteration of the lower housing surface adjacent the midline to provide support for said member.

* * * * *

UNITED STATES PATENT AND TRADEMARK OFFICE
CERTIFICATE OF CORRECTION

PATENT NO.    : 6,695,316 B2
DATED         : February 24, 2004
INVENTOR(S)   : Popa et al.

It is certified that error appears in the above-identified patent and that said Letters Patent is hereby corrected as shown below:

Column 7,
Line 29, insert -- situated in part in said slots -- between "members" and "engaging between said lower housing".

Column 8,
Line 13, delete "annular segments about the axis" and insert -- arcuate segments about the axis --.
Line 15, insert -- said segments including at least a pair of upper segments lying within the upper housing and at least a pair of lower segments lying within the lower housing, -- between "sealing face projecting from said groove," and "a method of installing the segments".
Lines 18-19, delete "a pair of said plurality of segments" and insert -- said pair of lower segments --.
Line 24, insert -- coincident with and -- between "lower housing" and "forming part of".
Line 26, delete "the pair of segments" and insert -- said pair of lower segments --.

Signed and Sealed this

Twenty-fifth Day of May, 2004

JON W. DUDAS
*Acting Director of the United States Patent and Trademark Office*